United States Patent
Schenk, Jr.

(10) Patent No.: US 6,227,264 B1
(45) Date of Patent: May 8, 2001

(54) VESSEL APERTURE ADAPTER

(75) Inventor: William P. Schenk, Jr., Rockford, TN (US)

(73) Assignee: Robertshaw Controls Company, Knoxville, TN (US)

( * ) Notice: Subject to any disclaimer, the term of this patent is extended or adjusted under 35 U.S.C. 154(b) by 0 days.

(21) Appl. No.: 09/480,751

(22) Filed: Jan. 10, 2000

Related U.S. Application Data
(60) Provisional application No. 60/145,583, filed on Jul. 26, 1999.

(51) Int. Cl.[7] ........................................... B65B 1/04
(52) U.S. Cl. ............................ 141/95; 141/286; 220/86.2
(58) Field of Search ................................. 141/83, 94, 95, 141/286; 137/386; 73/294, 325, 290 R; 220/86.2

(56) References Cited

U.S. PATENT DOCUMENTS

| | | |
|---|---|---|
| 24,179 | 5/1859 | McLeod . |
| 53,841 | 4/1866 | Lloyd . |
| 1,953,669 | 4/1934 | Bettes . |
| 1,990,386 | 2/1935 | Kysor . |
| 2,031,849 | 2/1936 | O'Leary . |
| 2,146,211 | 2/1939 | Hail . |
| 2,524,313 | 10/1950 | Gerling . |
| 3,136,295 | * 6/1964 | Gramo . |
| 4,367,769 | 1/1983 | Bain . |
| 4,440,028 | * 4/1984 | Ramlow . |
| 4,787,407 | * 11/1988 | Vogel . |
| 4,901,776 | 2/1990 | Attinello . |
| 4,997,013 | 3/1991 | Peckles . |

* cited by examiner

*Primary Examiner*—Steven O. Douglas
(74) *Attorney, Agent, or Firm*—Sampson & Associates, P.C.

(57) ABSTRACT

An adapter is provided for facilitating simultaneous level-monitoring and filling of a vessel through a single vessel aperture. The adapter also reduces backflow that may occur during the filling process. The adapter comprises an aperture engagement end which is adapted to couple with the aperture of a vessel. The adapter also includes a plurality of inlets, pathways and outlets. A first pathway is substantially straight and is adapted to receive a level-monitoring devices easily couple with this first pathway. The adapter also comprises a second pathway which is free from fluid communication with the other pathway. This discrete second pathway is used for filling the vessel with minimal fluid backflow. This discrete second pathway also protects the level-monitoring device from possible damage.

17 Claims, 3 Drawing Sheets

VESSEL APERTURE ADAPTER

This application claims priority to U.S. Provisional Patent Application serial No. 60/145,583 filed Jul. 26, 1999, and which is fully incorporated by reference, herein.

BACKGROUND

Storage tanks or vessels have apertures that are used for various purposes. Typically, one of these apertures is used for permanently installing a pump. Other vessel apertures are used for filling, installing a level-monitoring device and for installing a sight-gauge or other devices.

A level-monitoring device installed in a vessel aperture makes it easy to quickly monitor the level of liquid or solid in a vessel. Simplifying the level-monitoring leads to more frequent monitoring of the vessel and therefore lowers the chances of unexpectedly finding empty vessels. For example, if the vessel is a diesel fuel storage tank on a farm, and the tank unexpectedly becomes empty, this will cause downtime on the farm equipment. This may also cause downtime for equipment operators while they wait for more fuel to be delivered.

Many older vessels have only two apertures. One of these apertures usually has a permanently installed pump If the owner wants to prevent unexpected empty tanks, he may install a level-monitoring device in this available aperture. However, every time the vessel needs to be filled, the monitor device must be removed, the tank filled and then the monitor device reinstalled. This is time consuming, may damage the level-monitoring device and may lead to the device being lost or not being reinstalled.

One proposed solution is to install more apertures into a vessel, however this requires many steps. First, the vessel must be completely empty, moreover, if it is a fuel tank, it needs to be filled with water to prevent a flash fire while drilling. Next, a vertical opening must be drilled into the vessel, and then a threaded collar must be permanently vertically installed into the aperture. Finally, all of the water and debris must be cleaned from the tank. This process is expensive, time consuming and may be dangerous if performed improperly.

Another drawback associated with vessel apertures is backflow, which is the fluid that spills out of the vessel during the vessel filling process. Backflow is generated by air venting up into the fluid coming down the fill nozzle. Backflow wastes fuel, is bad for the environment and slows down the filling process.

For the foregoing reasons, there is a need for an adapter which allows simultaneous filling and level-monitoring through a single vessel aperture. There is also a need for an adapter that can fill a vessel with minimal fluid backflow.

SUMMARY

The present invention is directed to an adapter that satisfies this need for simultaneous level-monitoring and filling of a vessel through a single vessel aperture. The adapter also satisfies the need for reducing the backflow that may occur while filling a vessel.

Accordingly, the invention provides in one aspect an adapter including an inlet end having a plurality of inlets and an aperture engagement end for coupling with an aperture of a vessel. This adapter has three pathways, wherein the first pathway is substantially straight, provides a straight line of sight therethrough and is adapted to receive a level-monitoring device therein. The first pathway extends from a first inlet to a first outlet. The second pathway extends from a second inlet to a second outlet. The third pathway extends from a third inlet to the first outlet. The second pathway is free from fluid communication with the first and third pathways.

In an alternative embodiment, the adapter may include, for example, a level-monitoring device disposed in the first inlet. In addition, the adapter may further comprise an endcap fitting adapted to receive a cap to simultaneously close both the second inlet and the third inlet.

The present invention provides, in a different aspect, a method for simultaneously filling and monitoring the material level of the vessel through a single aperture.

This method includes providing an adapter having an inlet end and an aperture engagement end, in which the inlet end includes a plurality of inlets, and the aperture engagement end is adapted for being coupled with the aperture of a vessel. The adapter has first, second and third pathways, in which the first pathway extends from a first inlet to a first outlet, the second pathway extends from a second inlet to a second outlet, and the third pathway extends from a third inlet to a first outlet. The first pathway is substantially straight to provide a straight line of sight therethrough and is also adapted to receive a level-monitoring device therein. The second pathway is free from fluid communication with the first pathway and the third pathway.

Subsequent steps include coupling the aperture engagement end with the vessel aperture and installing a level-monitoring device into the first pathway. The vessel is then filled through the second pathway of the adapter. An additional step includes monitoring the material level in the vessel with the level-monitoring device.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
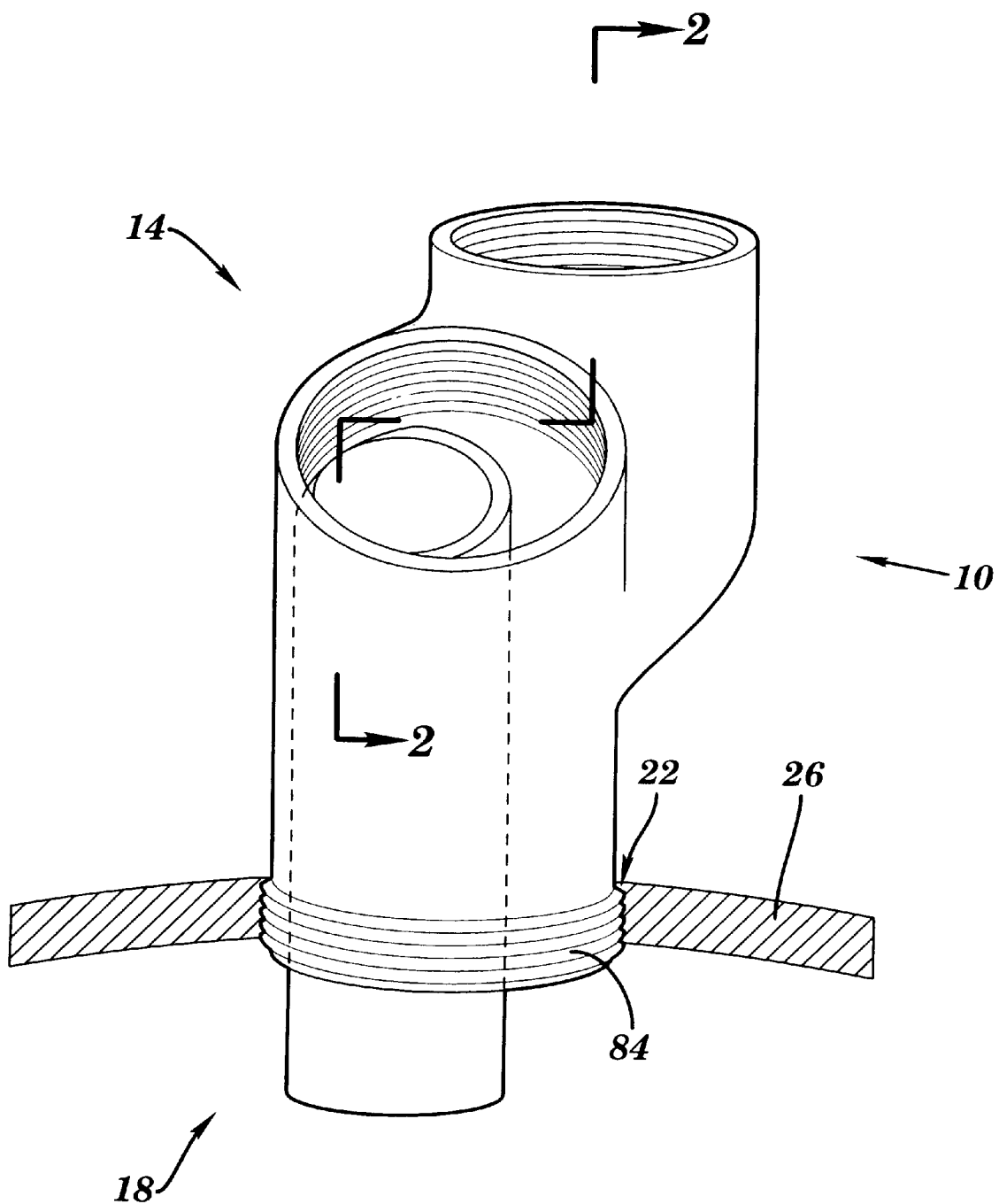
FIG. 1 is a perspective view of a version of the adapter.

Referring to the figures set forth in the accompanying Drawings, the illustrative embodiments of the present invention will be described in detail hereinbelow.

For clarity of exposition, like features shown in the accompanying Drawings shall be indicated with like reference numerals and similar features as shown in alternate embodiments in the Drawings shall be indicated with similar reference numerals.

Where used in this disclosure, the term "bung hole" when used in connection with an element described herein, shall refer to an aperture within a stationary storage tank or vessel which is used for filling, level-monitoring, venting or other uses.

The present invention is an adapter 10 that satisfies the need for simultaneous level-monitoring and filling of a vessel 26 through a single vessel aperture 22. The adapter 10 also satisfies the need for reducing the backflow that may occur while filling a vessel 26.

As shown in FIG. 1, the adapter 10 has an inlet end 14 and an aperture engagement end 18. The inlet end 14 has a plurality of inlets. The aperture engagement end 18 extends through an aperture such as vessel aperture 22 to couple thereto. The aperture may be disposed in a tank, barrel or container such as the vessel 26. The adapter 10 is fabricated from metal, or alternatively from other materials such as plastic or composites.

Figure 2:
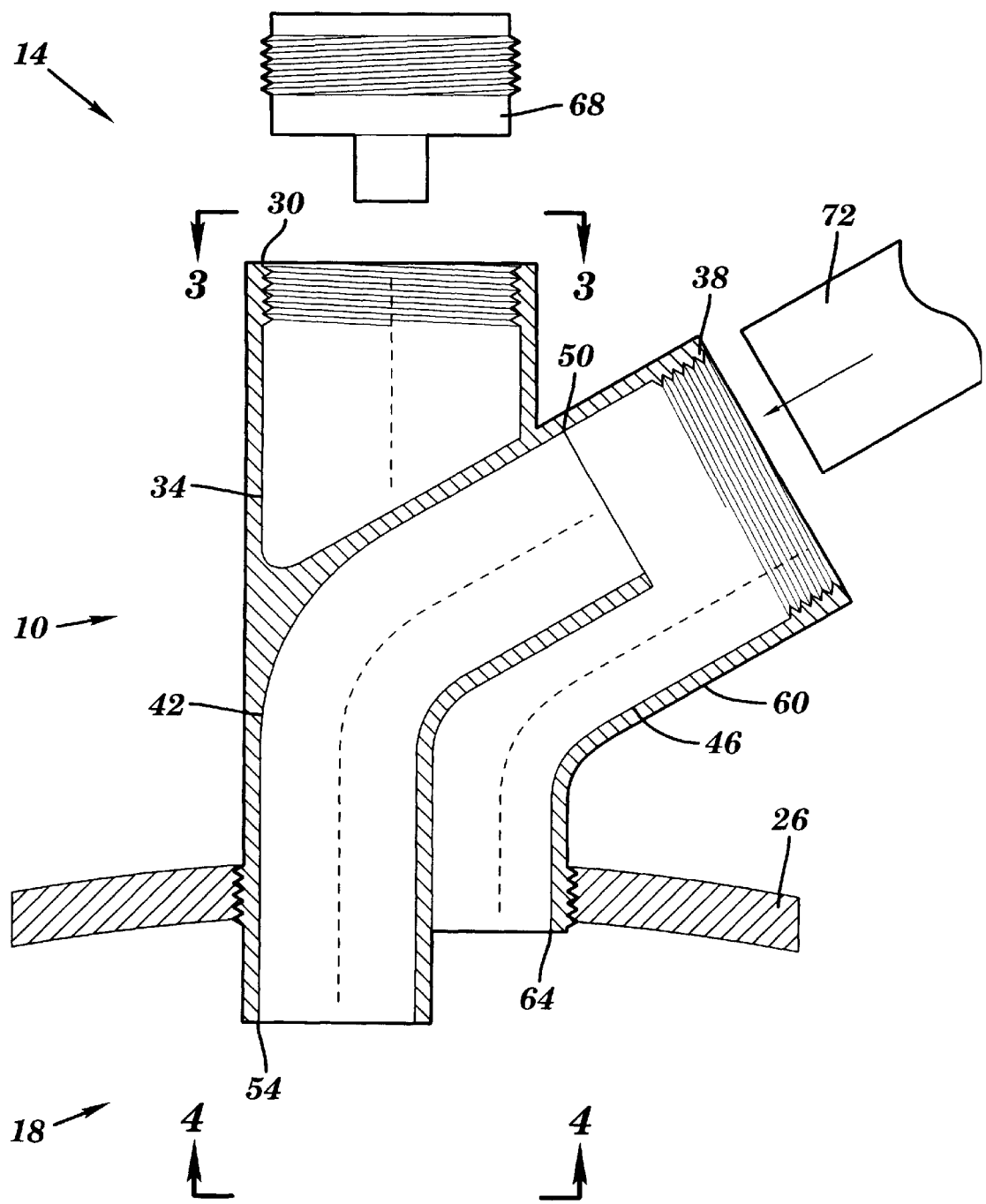
FIG. 2 is a front longitudinal offset sectional view, of the adapter taken along 2—2 of FIG. 1.

In a preferred embodiment, as best shown in FIG. 2, the inlet end 14 has two openings; a first inlet 30, which leads into a first pathway 34 and an other opening referred to herein as an end cap fitting 38. The end cap fitting 38 leads into both the second pathway 42 and the third pathway 46.

The second pathway 42 extends from a second inlet 50 to a second outlet 54. The third pathway 46 extends from a third inlet 60, merges with the first pathway 34 and then terminates at the first outlet 64. The first pathway 34 extends from a first inlet 30, merges with the third pathway 46 and terminates with the first outlet 64. The aperture engagement end 18 has two openings, the first outlet 64 and the second outlet 54. The second pathway 42 is separate from the third pathway 46 and the first pathway 34. The third pathway 46 and first pathway 34 begin as two separate pathways and then merge into one single pathway that terminates at the first outlet 64.

In another embodiment, a level-monitoring device 68 extends into the first pathway 34, and couples with the first inlet 30. Also shown in FIG. 2 is a fill pipe (i.e., nozzle) 72 that may be inserted into the second pathway 42 to fill the vessel 26.

Figure 3:
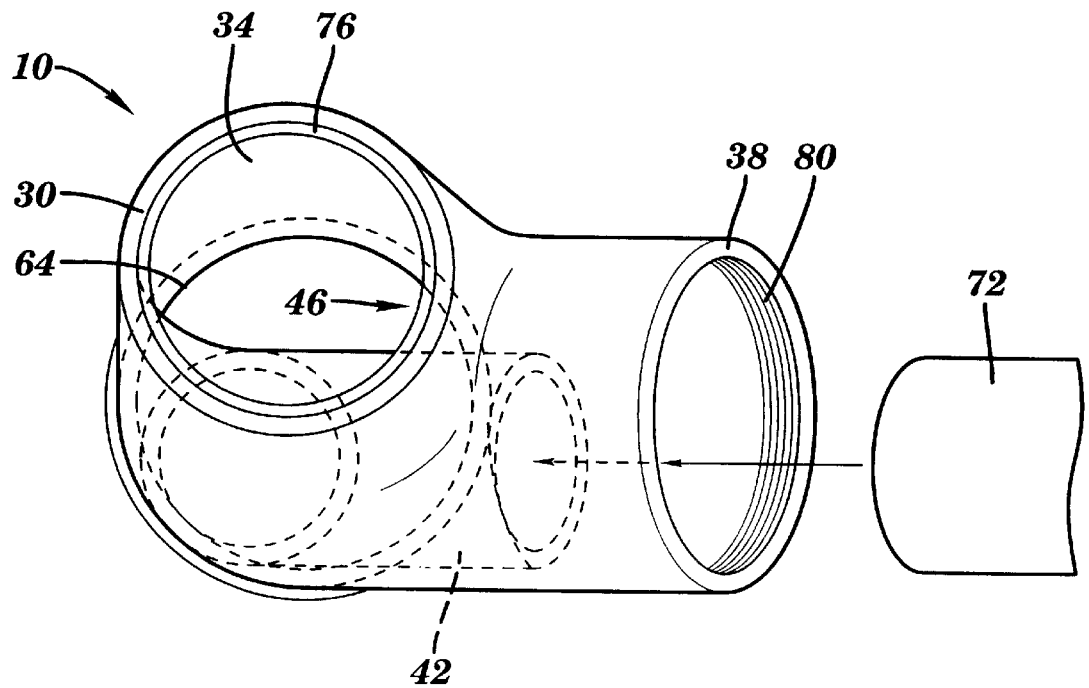
FIG. 3 is a top plan view of the adapter taken along 3—3 of FIG. 2.

FIG. 3 shows the third pathway 46 merging with the first pathway 34 and both of them terminating at the first outlet 64. The first inlet 30 may have internal threads 76. The end cap fitting 38 may also have internal threads 80. As also shown, the second pathway 42 is preferably sized and shaped to receive a standard fill pipe 72.

Figure 4:
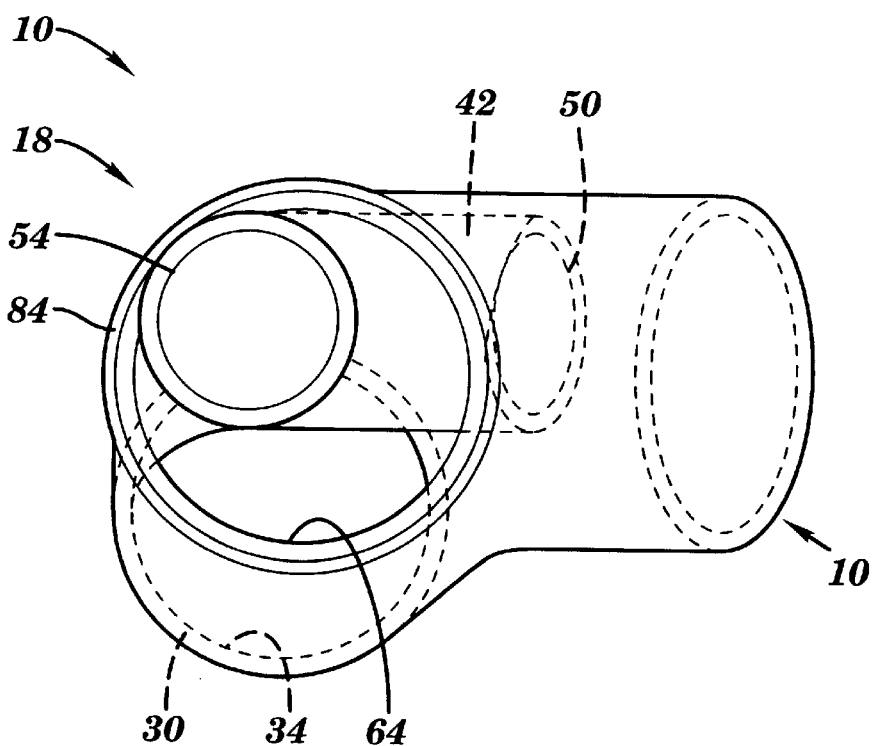
FIG. 4 is a bottom plan view of the adapter taken along 4—4 of FIG. 2.

In a preferred embodiment, as shown in FIG. 4, the first pathway 34 is substantially straight. As discussed hereinabove, the first pathway 34 extends from the first outlet 64 through the adapter 10 and terminates at the first inlet 30. The second outlet 54 is located at the aperture engagement end 18 of the second pathway 42. The second inlet 50 of the second pathway 42 is located at the inlet end 14. The aperture engagement end 18 is coupled with the vessel 26 by using any conventional coupling means such as external threads 84. In this regard, it should be recognized that engagement end 18 may be coupled with the vessel 26 using any number of techniques well-known to those skilled in the art, including, for example, internal threads, bayonet couplings, quick release couplings, quarter-turn couplings, press-fit engagement, chemical bonding (i.e., adhesive), and by forming the end 18 integrally with the vessel 26, etc.

Many older vessels have only two apertures. A pump is usually permanently installed in one of the apertures. This leaves only one aperture available for filling, level-monitoring, venting and all other uses. Adapter 10, of the present invention, facilitates simultaneous level-monitoring, reduced backflow filling and venting of a vessel through a single aperture without the disadvantages of having to remove and reinstall the level monitoring device each time the vessel is filled. The expensive process of installing additional apertures into a vessel or having to purchase a new vessel is also avoided by using the adapter 10.

The present invention has many advantages relative to the prior art. For example, the first pathway 34 advantageously provides a straight line of sight into the vessel 26. The straight line of sight allows nominally any conventional level-monitoring device to operate with the adapter 10. Examples of such devices include capacitance, ultrasonic, laser, radar and float type level-monitoring devices. Moreover, the first inlet 30 is sized and shaped, and/or otherwise adapted to conveniently couple with most conventional level-monitoring devices.

It this regard, it should be recognized that any configuration of a first pathway 34 having a substantially straight line of sight, may be used with a conventional level-monitoring device and thus be construed to be within the scope of the present invention. Moreover, first inlet 30 of the first pathway 34 may be coupled with such level monitoring devices using any number of techniques well-known to those skilled in the art, including, for example, internal threads, bayonet couplings, quick release couplings, quarter-turn couplings, press-fit engagement, chemical bonding (i.e., adhesive), etc., without departing from the spirit and scope of the present invention.

In addition, backflow is minimized by providing separate pathways 42 and 46 for filling and for venting, respectively.

Moreover, separation of the second pathway 42 from the first pathway 34 advantageously serves to help prevent damage to the level-monitoring device 68 from the fill nozzle 72. The second outlet 54 is also preferably angled to direct the fluid or solid fill material away from a level-monitoring device disposed in the first pathway 34.

Still further, to minimize damage to the level-monitoring device 68 while filling the vessel 26, the second outlet 54 is not coterminous with the first outlet 64 but rather, extends further into the vessel 26 than first outlet 64. This also helps to keep the fluids or solids away from the level-monitoring device 68.

Although the invention has been shown and described with respect to a curved second pathway, it should be understood by those skilled in the art that the second pathway may be substantially straight as long as it is separate and discrete from the other pathways, without departing from the spirit and scope of the present invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

What is claimed is:

1. An adapter for facilitating simultaneous level-monitoring and filling of a vessel through an aperture, the adapter comprising:

an inlet end and an aperture engagement end, wherein said inlet end includes a plurality of inlets, and said aperture engagement end is adapted for being coupled with the aperture of a vessel;

said adapter having first, second and third pathways, wherein said first pathway extends from a first inlet to a first outlet, and said second pathway extends from a second inlet to a second outlet, and said third pathway extends from a third inlet to said first outlet;

said first pathway being substantially straight to provide a straight line of sight therethrough;

said first pathway being sized and shaped to receive a level-monitoring device; and said second pathway being free from fluid communication with said first pathway and said third pathway.

2. The adapter of claim 1, wherein said straight line of sight is substantially vertical when said adapter is coupled with the aperture.

3. The adapter of claim 2, wherein said first pathway is sized and shaped to receivably maintain the level-monitoring device in a substantially vertical orientation.

4. The adapter of claim 3, wherein said first pathway comprises a level-monitoring conduit.

5. The adapter of claim 3, wherein at least a portion of said second outlet extends divergently from said first outlet.

6. The adapter of claim 3, wherein said second outlet is not coterminous with said first outlet.

7. The adapter of claim 6, wherein said second pathway extends further in a downstream direction than said first outlet.

8. The adapter of claim 3, wherein said second inlet is sized and shaped to receive a fill nozzle therein.

9. The adapter of claim 3, further comprising an endcap fitting sized and shaped to engage a cap to close both said second inlet and said third inlet.

10. The adapter of claim 3, wherein said first inlet is internally threaded.

11. The adapter of claim 3, further comprising a level-monitoring device disposed in said first pathway.

12. An adapter for facilitating simultaneous level-monitoring and filling of a vessel through a bung hole, the adapter comprising:

an inlet end and an aperture engagement end, wherein said inlet end includes a plurality of inlets, and said aperture engagement end is adapted for being coupled with the bung hole of a vessel;

said adapter having a first pathway and a second pathway, wherein said first pathway extends from a first inlet to a first outlet and said second pathway extends from a second inlet to a second outlet;

said second pathway being free from fluid communication with said first pathway; and a level-monitoring device disposed in said first pathway.

13. The adapter of claim 12, wherein said level monitoring device is a device selected from the group consisting of a capacitance level-monitoring device, a laser level-monitoring device, an ultrasonic level-monitoring device, a radar level-monitoring device and a float type level-monitoring device.

14. The adapter of claim 12, wherein said first pathway is substantially straight to provide a straight line of sight into said aperture.

15. The adapter of claim 12, further comprises a third pathway extending from a third inlet to said first outlet.

16. The adapter of claim 15, wherein said second pathway is free from fluid communication with said first pathway and said third pathway.

17. A method for simultaneously filling and monitoring the material level of a vessel through a single aperture, said method comprising the steps of:

(a) providing an adapter having an inlet end and an aperture engagement end, wherein the inlet end includes a plurality of inlets, and the aperture engagement end is adapted for being coupled with the aperture of a vessel;

the adapter having first, second and third pathways, wherein the first pathway extends from a first inlet to a first outlet, and the second pathway extends from a second inlet to a second outlet, and the third pathway extends from a third inlet to a first outlet;

the first pathway being substantially straight to provide a straight line of sight therethrough;

the first pathway being sized and shaped to receive a level-monitoring device; and the second pathway being free from fluid communication with the first pathway and the third pathway;

(b) engaging the aperture engagement end with the vessel aperture;

(c) providing a level-monitoring device;

(d) installing the level-monitoring device into the first pathway;

(e) filling the vessel through the second pathway of the adapter;

(f) monitoring the material level in the vessel with the level-monitoring device; and (g) wherein the adapter facilitates the simultaneous filling and fluid level-monitoring of the vessel through a single aperture.

* * * * *